May 19, 1959   M. P. BAGDANOVICH ET AL   2,887,055
TRAINING AND TEST MISSILE
Filed Aug. 7, 1956   2 Sheets-Sheet 2
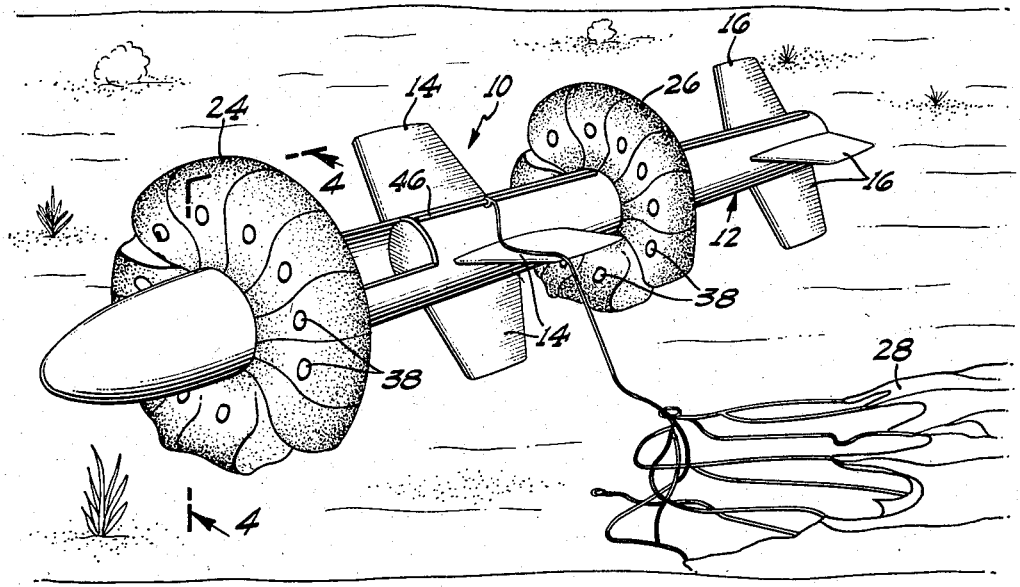
FIG. 3.
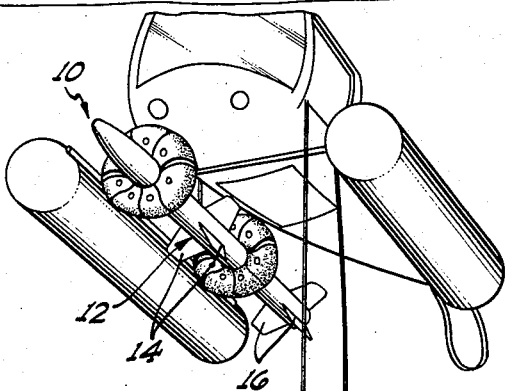
FIG. 2.
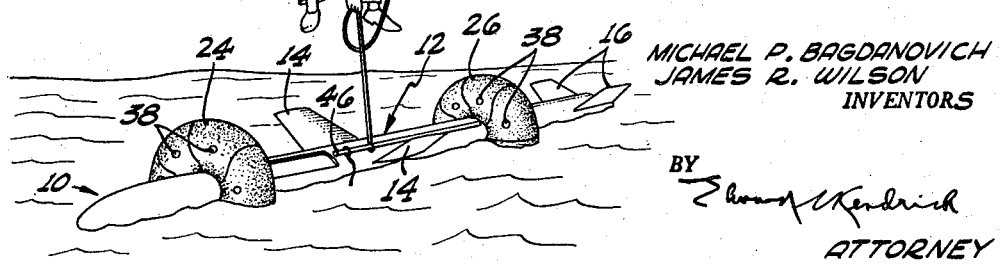
MICHAEL P. BAGDANOVICH
JAMES R. WILSON
INVENTORS
BY
ATTORNEY United States Patent Office
2,887,055
Patented May 19, 1959

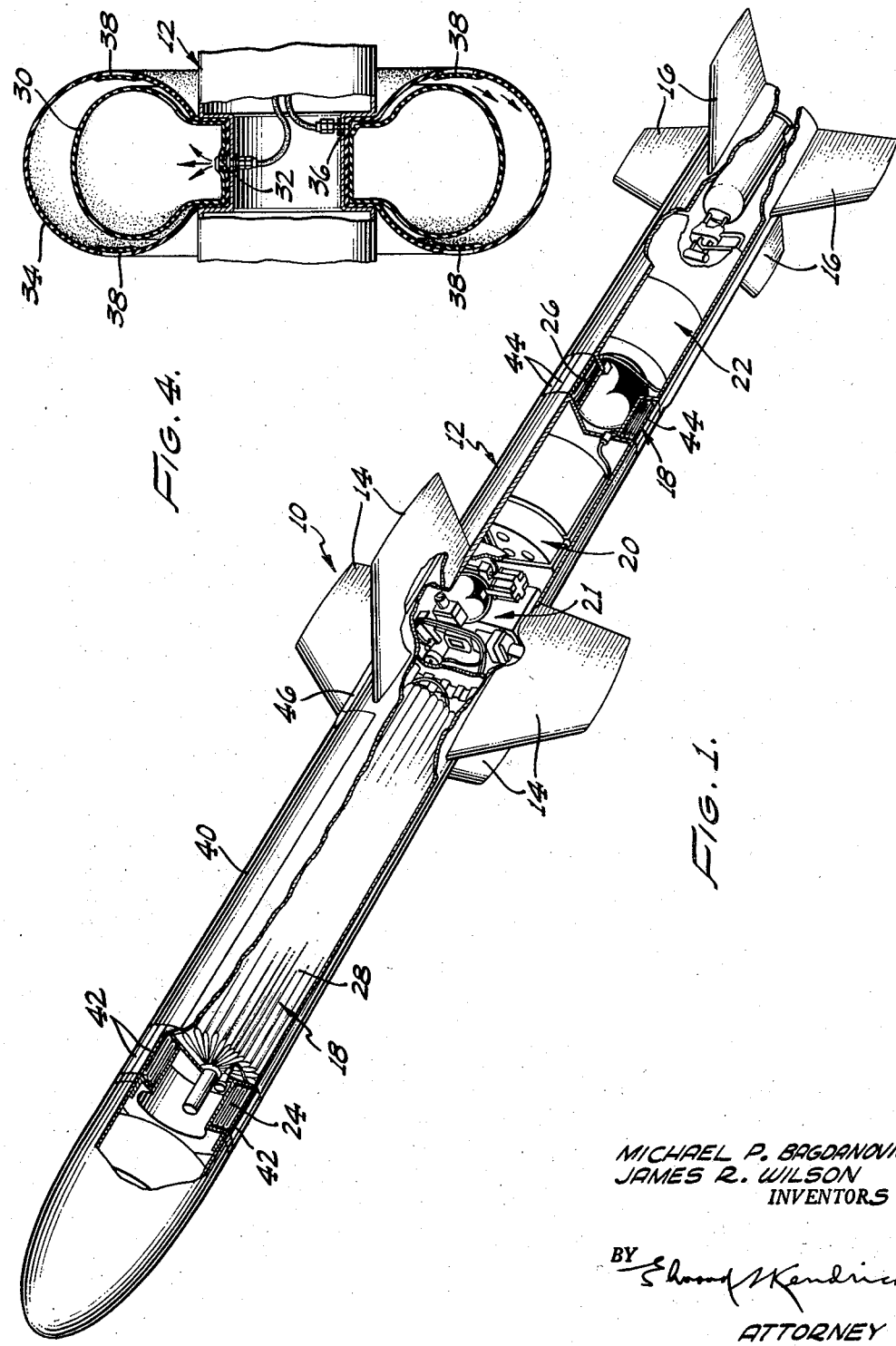

2,887,055

TRAINING AND TEST MISSILE

Michael P. Bagdanovich, San Pedro, and James R. Wilson, Glendale, Calif., assignors to Harvey Machine Co., Inc., Torrance, Calif., a corporation of California Application August 7, 1956, Serial No. 602,532

2 Claims. (Cl. 102—50)

This invention relates to the construction of guided missiles and more particularly to a missile which may be launched over and over again to train personnel in proper missile firing and control techniques including an empirical evaluation of ground control, ground test, checkout and calibration equipment as well as to test the whole or separate component parts of an associated guidance control, and/or propulsion system of the missile.

At the present time military service and private industries technical personnel generally have very little opportunity to fire live missiles because the missiles themselves are extremely expensive and are not, therefore, generally expendable for training purposes. This situation has created many problems because operating personnel must have actual firing experience and preferably a great deal of it in order to become competent in the operation of guided missiles and their allied ground launching and control equipment.

For example, at the present stage of countermeasures development, it is generally accepted that a human operator must be employed to control his own target tracking radar manually to effectively overcome enemy jamming techniques. This requirement is generally made in military applications because a well-trained radar operator can react to unexpected jamming signals far better than any known electronic tracking devices.

In any future conflict the probability of enemy attack without the support of some means of electronic countermeasures activity is practically nil.

In the case of command guidance systems its effective use requires that a target tracking radar operator or operators employ his or their anti-jamming techniques without losing control of the airborne missile while in the process.

Automatic electronic equipment designed to simulate the controlled missile motion in tactical situations for training purposes has not as yet been adequately produced. The principal reason being cost and inherent inability to simulate non-linear dynamic functions of the missile. In this regard personnel training, which is dependent on the simulated characteristics of a missile in flight, is limited.

The invention herein described provides a training vehicle which overcomes the disadvantages of ground simulators and also provides a means of an airborne missile countermeasures training capability with a relatively economical missile firing cost, as well as providing a realistic and empirical evaluation of ground control, ground test, checkout and calibration equipment.

As stated previously, the excessive cost of tactical missiles permits the use of only a limited number of obsolete units for training purposes. Thus, the cost of the rapid fire of several tactical missiles is obviously prohibitive in spite of the fact that this undoubtedly corresponds to the exact condition under which most missiles would be fired in war time. Therefore operating personnel are currently deprived of the very experience they should be given.

From the foregoing, it can be seen that the need for a missile which may be employed for training purposes and the checkout of ground equipment is great. However, this is by no means the only problem confronting current missile development programs. An urgent need also exists for a test missile, i.e., one which may be recovered with a minimum amount of damage in order that the operation of all or specific component parts of a missile may be evaluated after an operational flight. In this manner component malfunctions could be much more readily isolated and analyzed. Such a procedure would reduce the cost and time of trouble shooting missile components, thereby reducing the expense involved in extended repetitive testing of a tactical missile in actual flight.

The invention overcomes these and other disadvantages of the prior art by providing a relatively inexpensive missile which may have a convenient range for training, checkout of ground equipment, or test purposes. With any useful device, its cost is always some consideration. However, with a training and test missile, cost is an extremely important consideration, because, as explained previously, in a great many instances it simply prohibits adequate training and test uses. It is, therefore, an object of the invention to provide a training and test missile having an average overall firing cost of considerably lesser magnitude than that of conventional tactical missiles.

The cost of firing training and test missiles of the invention is kept at a minimum by employing a construction to permit the maximum recovery of undamaged component parts of a missile whether it lands on land or water. In addition, the cost of the training and test missile is spread over several firings by providing for a maximum recovery capability.

The invention accordingly comprises means for propelling the missile, means in the missile for guiding and controlling the missile, means attached to the missile and operative at a time before the missile falls to the earth to provide aerodynamic drag and thereby to limit the speed of the missile as it falls to earth, and means connected to the missile to reduce the impact loads imposed upon it when it contacts the earth.

According to a specific feature of the invention, damage is minimized and water recovery additionally provided by the use of a special buffer and flotation device to reduce impact loads imposed upon the missile when it falls to earth. This device comprises a flexible membrane providing at least one surface portion of an enclosure, the membrane being connected to the missile in a position to contact the earth before the missile itself does, and a fluid volume contained within the enclosure with at least a portion of the membrane having an ultimate strength small enough to burst after intial impact of the membrane against the earth, the membrane being so constructed that when it bursts an opening is created in it for the escape of the fluid at a rate such that only a relatively small portion of the energy stored in compression of the fluid is re-transmitted to the missile to cause it to rebound.

It is therefore an object of the invention to provide an inexpensive airborne vehicle for use in the training of personnel, the testing of missile components and subsystems; and to provide a realistic and empirical evaluation of all ground control, ground test, checkout and calibration equipment.

Another object of the invention is to provide an airborne training and test vehicle having means to permit its recovery on land or water with a minimum amount of damage.

It is further an object of the invention to provide an airborne training and test vehicle having means to absorb impact loads imposed upon it when it contacts the earth or water.

Still a further object of the invention is to provide an airborne training and test vehicle which may be economically reused a relatively large number of times. And in addition it is the object of this invention to provide an airborne training and test vehicle which has basic compartments or sections each serving essentially as a single function, other than airframe structure, which can be easily substituted or replaced by a like structural section but having a variation of internal mechanism if so desired.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Fig. 1 is a broken away isometric view of the training and test vehicle of the invention;

Fig. 2 is a view of the vehicle in a condition to be recovered from a body of water;

Fig. 3 is a view of the vehicle as it may be recovered on land; and

Fig. 4 is a section on the line 4—4 shown in Fig. 3 of the buffer and flotation device employed with the vehicle.

In the drawing in Fig. 1 a missile 10 is shown comprising an elongated tubular body portion 12 having forward and rear aerodynamic surfaces 14 and 16 extending radially therefrom. The missile 10 also comprises a recovery system 18, a guidance system 20, an aerodynamic control system 21 and a propulsion system 22.

The recovery system 18 comprises front and rear buffer and flotation devices 24 and 26, respectively, which are employed in conjunction with a parachute assembly 28. It is of course obvious that other aerodynamic drag means may be employed in lieu of the parachute 28, e.g., devices called roto-chutes, spoilers, etc., may be employed.

The buffer and flotation devices 24 and 26 are preferably inflatable to a toroidal-like shape to reduce impact loads on the missile 10 when it contacts the earth. The buffer and flotation devices 24 and 26 may be inflatable from, for example, compressed carbon dioxide in capsules of the well-known type.

When the buffer and flotation devices 24 and 26 are in fact inflated, they serve two purposes. The first is to permit recovery of the missile 10 when it is fired over a body of water by aiding the missile in floating. Recovery may be made as indicated in Fig. 2.

Land recovery may be made as indicated in Fig. 3. The manner in which the buffer and flotation devices 24 and 26 of the recovery system operates is better illustrated in Fig. 4. Air or some other gas or fluid may be introduced into an inner tube 30 as shown in Fig. 4 at a valve 32. The same expansion media may be introduced into an outer membrane or tube 34 by means of a valve at 36. The outer tube 34 is preferably provided with a plurality of individual relief areas 38 on each side thereof to blow out when the pressure inside the membrane 34 exceeds a predetermined value. The relief areas 38 are preferably constructed to release the fluid media confined within the membrane 34 at a rate to prevent very little retransmission of energy stored in the compression of the media to the missile 10 itself and therefore restrict the missile rebound tendencies.

The buffer and flotation devices 24 and 26 are preferably inflated or filled after covers 42 and 44 are automatically released from the missile airframe. The cover 40 is preferably jettisoned off of the missile airframe to permit the escape of the parachute 28. The parachute may be connected to the missile at any appropriate place on the missile, such as a central suspension point 46, or bridled longitudinally or circumferentially, but preferably at a position to lower the missile horizontally.

In the operation of the missile 10, it is either ground or air launched; and at a predetermined time, altitude or speed, the parachute 28 is released, after which at another predetermined interval, the inner and outer membranes of each of the buffers 24 and 26 are inflated either simultaneously or consecutively therewith. When the missile 10 falls to the earth, its speed thus is limited by the parachute 28 or other drag means if they are employed, and the initial impact of the missile 10 when it falls to the earth is substantially lessened by the outer membranes of each of the buffer and flotation devices 24 and 26 when the patches thereon blow out. It should be noted a single membrane may be used and adapted so as to cover the initial contact area in place of the dual system shown.

The outer membranes may be attached to the missile in any convenient manner and may be of the same general cross section as the inner membranes, i.e., completely enclosed. Similarly, the inner membranes need not necessarily be completely enclosed as shown in Fig. 4. It is to be noted further that the outer membranes may be employed independently of the inner ones although the inner ones are preferably additionally employed.

It will be obvious to those skilled in the art that many other changes and modifications of the invention may be made without departing from the true scope thereof as defined in the appended claims.

What is claimed is:

1. A missile comprising: an elongated missile body having control surfaces extending therefrom; forward and rear toroidal-like inflatable outer elastic membranes disposed internally and substantially concentrically about the longitudinal axis of said missile body; forward and rear toroidal-like inner elastic membranes disposed within corresponding ones of said outer flexible membranes, respectively; means to inflate said inner membranes with a gas to distend them radially beyond the radial extremities of said control surfaces; and means to inflate said outer membranes with a gas to distend each of them radially beyond said inner membranes, said outer membranes being constructed to burst and create an opening in themselves for the escape of said gas at a rate such that only a relatively small portion of the energy stored in said gas, when the missile falls to the earth, is retransmitted to the missile to cause it to rebound.

2. A missile comprising: an elongated missile body having control surfaces extending therefrom; forward and rear toroidal inflatable outer elastic membranes disposed internally and substantially concentrically about the longitudinal axis of said missile body at two points along its length; forward and rear toroidal inner elastic membranes disposed within corresponding ones of said outer membranes respectively; means to inflate said inner membranes with a gas to extend them radially beyond the radial extremities of said control surfaces; means to inflate said outer membranes with a gas to distend each of them radially beyond said inner membranes, said outer membranes being constructed to burst and create an opening in themselves for escape of said gas at a rate such that only a relatively small portion of the energy stored in said gas is retransmitted to the missile to cause it to rebound on impact against the earth; and parachute means connected to said missile body in a manner to support it in a substantially horizontal position as said missile body falls to the earth.

References Cited in the file of this patent

UNITED STATES PATENT

| | | |
|---|---|---|
| 1,694,873 | Brunner | Dec. 11, 1928 |
| 2,122,740 | Eckenroth | July 5, 1938 |

(Other references on following page)

UNITED STATES PATENTS

| | | |
|---|---|---|
| 2,452,783 | Nebesar | Nov. 2, 1948 |
| 2,465,581 | Ferrel | Mar. 29, 1949 |
| 2,702,579 | Culver | Feb. 22, 1955 |
| 2,706,605 | Rose et al. | Apr. 19, 1955 |
| 2,713,466 | Fletcher | July 19, 1955 |
| 2,719,685 | Bender | Oct. 4, 1955 |
| 2,745,095 | Stoddard | May 8, 1956 |

FOREIGN PATENTS

| | | |
|---|---|---|
| 107,050 | Great Britain | June 12, 1917 |
| 117,119 | Great Britain | July 3, 1918 |